United States Patent [19]

Hill

[11] Patent Number: 5,150,636
[45] Date of Patent: Sep. 29, 1992

[54] ROCK DRILL BIT AND METHOD OF MAKING SAME

[75] Inventor: Thomas E. Hill, Mercersburg, Pa.

[73] Assignee: Loudon Enterprises, Inc., Mercersburg, Pa.

[21] Appl. No.: 721,767

[22] Filed: Jun. 28, 1991

[51] Int. Cl.⁵ .................................. B21K 5/02
[52] U.S. Cl. .................. 76/108.2; 175/413; 175/417; 29/447
[58] Field of Search .................. 76/108.1, 108.2, 108.4; 175/412, 413, 414, 415, 417; 29/447

[56] References Cited

U.S. PATENT DOCUMENTS

| | | |
|---|---|---|
| 1,426,637 | 8/1922 | Hawkesworth . |
| 1,692,966 | 11/1928 | Treiber . |
| 1,955,728 | 4/1934 | Allen et al. .................. 62/1 |
| 2,479,698 | 8/1944 | Paquin . |
| 2,535,320 | 12/1950 | Richardson .................. 285/146 |
| 2,620,686 | 12/1952 | Peter .................. 76/108 |
| 2,757,007 | 7/1956 | Levy . |
| 2,757,906 | 8/1956 | Ryd . |
| 3,213,951 | 10/1965 | Eeles . |
| 3,304,816 | 2/1967 | Galorneau . |
| 3,372,452 | 3/1968 | Firth et al. .................. 29/156.4 |
| 3,655,244 | 4/1972 | Swisher . |
| 4,019,590 | 4/1977 | Hansen et al. . |
| 4,157,122 | 6/1979 | Morris .................. 175/369 |
| 4,190,125 | 2/1980 | Emmerich et al. . |
| 4,361,196 | 11/1982 | Hoyle, Jr. . |
| 4,405,074 | 9/1983 | Levintov et al. .................. 29/447 |
| 4,406,336 | 9/1983 | Olsen et al. .................. 175/410 |
| 4,427,082 | 1/1984 | Sarin et al. . |
| 4,462,148 | 7/1984 | Joyce .................. 29/447 |
| 4,631,973 | 12/1986 | Eley .................. 74/439 |
| 4,632,195 | 12/1986 | Emmerich . |
| 4,783,893 | 11/1988 | Farino .................. 29/447 |
| 4,934,883 | 6/1990 | Andersson et al. . |

FOREIGN PATENT DOCUMENTS 906381  8/1972  Canada .................. 29/447

Primary Examiner—Roscoe V. Parker
Attorney, Agent, or Firm—Eckert Seamans Cherin & Mellott

[57] ABSTRACT

A rock drill bit having a shank and a replaceable cutting head, comprising steps of producing a shank having a tip with an outer surface having a given shape, producing a head having a working face at one end and a recess at the other end with a cross-section corresponding in shape to that of said shank tip, and having a size about 0.15% less than that of said shank tip, cooling said shank in a cryogenic gas at ambient pressure to reduce its size, installing said head on said shank tip, and permitting the components to return to ambient temperature, to establish a shrink fit between the head and the shank.

19 Claims, 3 Drawing Sheets

ROCK DRILL BIT AND METHOD OF MAKING SAME

BACKGROUND OF THE INVENTION

This invention relates generally to rock drills and more particularly to a rock drill bit. The invention is also directed to a method of securing a removable head on the shank of a bit.

All rock drill bits comprise two parts—a head and a shank—which may or may not be integral. The function of the head is to break rock and to direct bits of broken rock away from the work face. Typically, tungsten carbide buttons or chisels permanently inserted into the working face of the head perform the breaking function. The head material must be tough and wear-resistant to withstand continual hammering and the abrasive effects of broken rock. Suitable head materials include through-hardening tool steels such as A2, A8 and D2; through-hardening alloy steel containing at least 1.8% nickel; work-hardening steels such as Hadfield steel, or case-hardening steels containing 0.15% to 0.25% carbon and at least 1.8% nickel. These materials have preferred characteristics, but other materials may be used instead. The shank's function is primarily to transfer percussive energy from a hammer to the head of the bit. The bit is also rotated in use, so some torque may be developed as well. Suitable materials for the shank may contain 1.8% or more nickel.

If the head and the shank of a bit can be made separately, then the best material for each may be selected, based on technical and economic requirements. Furthermore, the diameter of stock material used to make each component may be selected for that component alone, reducing scrap and costs. It remains to join the head to the shank in a way that retains the head with enough force so that is does not come off the shank in use, while permitting the head to be removed without damaging either part, particularly the shank. This of course rules out welding and other permanent bonding methods. If the components are designed for a press fit, the resulting union is not reliable under the hammering the bit takes in use. Furthermore, heavy press fits would damage the surfaces of the components, possibly rendering the shank unsuitable for re-use.

We have found that shrink fitting is a particularly suitable method of assembly, particularly when the parts have non-uniform cross-sections, and have developed methods for assembling and disassembling drill bit components having a 0.15% interference fit.

SUMMARY OF THE INVENTION

An object of this invention is to produce rock drill bits having improved life and performance.

Another object is to lower manufacturing costs for drill bits, by reducing required inventories, and by simplifying bit assembly. A related object is to reduce the consumption of resources, by minimizing waste during manufacture, and by reducing the frequency of shank disposal.

These and other objects are met by a method of making a rock drill bit having a shank and a replaceable cutting head, comprising steps of producing a shank having a tip with an outer surface, producing a head having a working face at one end and a recess at the other end with a cross-section corresponding in shape to that of said shank tip, and having a size in the range of 0.012%–0.38% less than that of said shank tip, cooling said shank in liquid nitrogen or other cryogenic fluid to reduce its size, installing said head on said shank tip, and permitting the components to return to ambient temperature, to establish a shrink fit between the head and the shank.

BRIEF DESCRIPTION OF THE DRAWINGS

In the accompanying drawings.

DESCRIPTION OF THE PREFERRED EMBODIMENT

Figure 1:
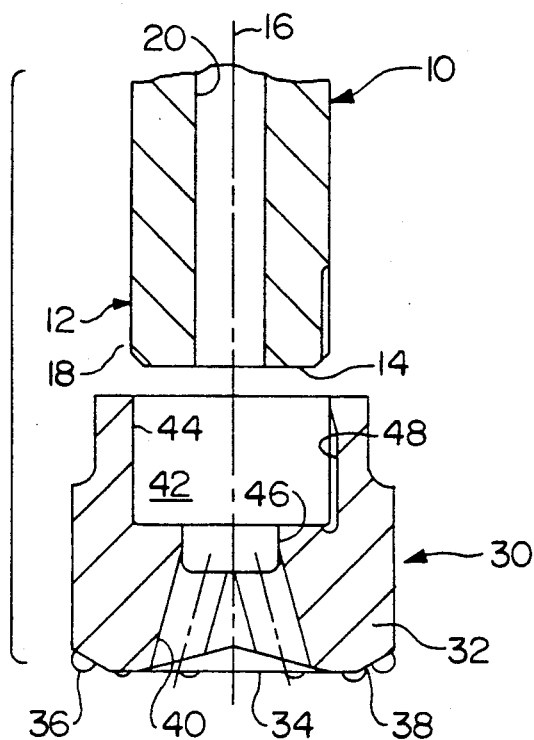
FIG. 1 is an exploded elevational view, in partial section, of a drill bit embodying the invention, showing the two components of the bit relatively positioned for assembly.
Figure 2:
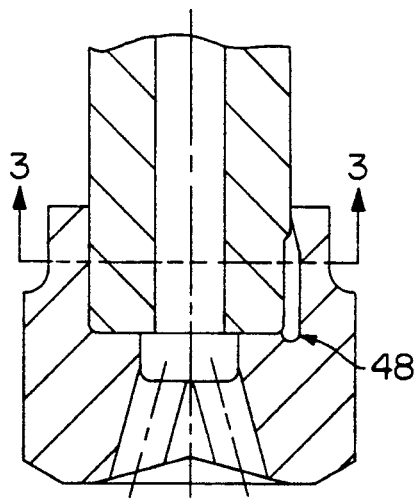
FIG. 2 is a view corresponding to FIG. 1, showing the parts assembled.
Figure 8:
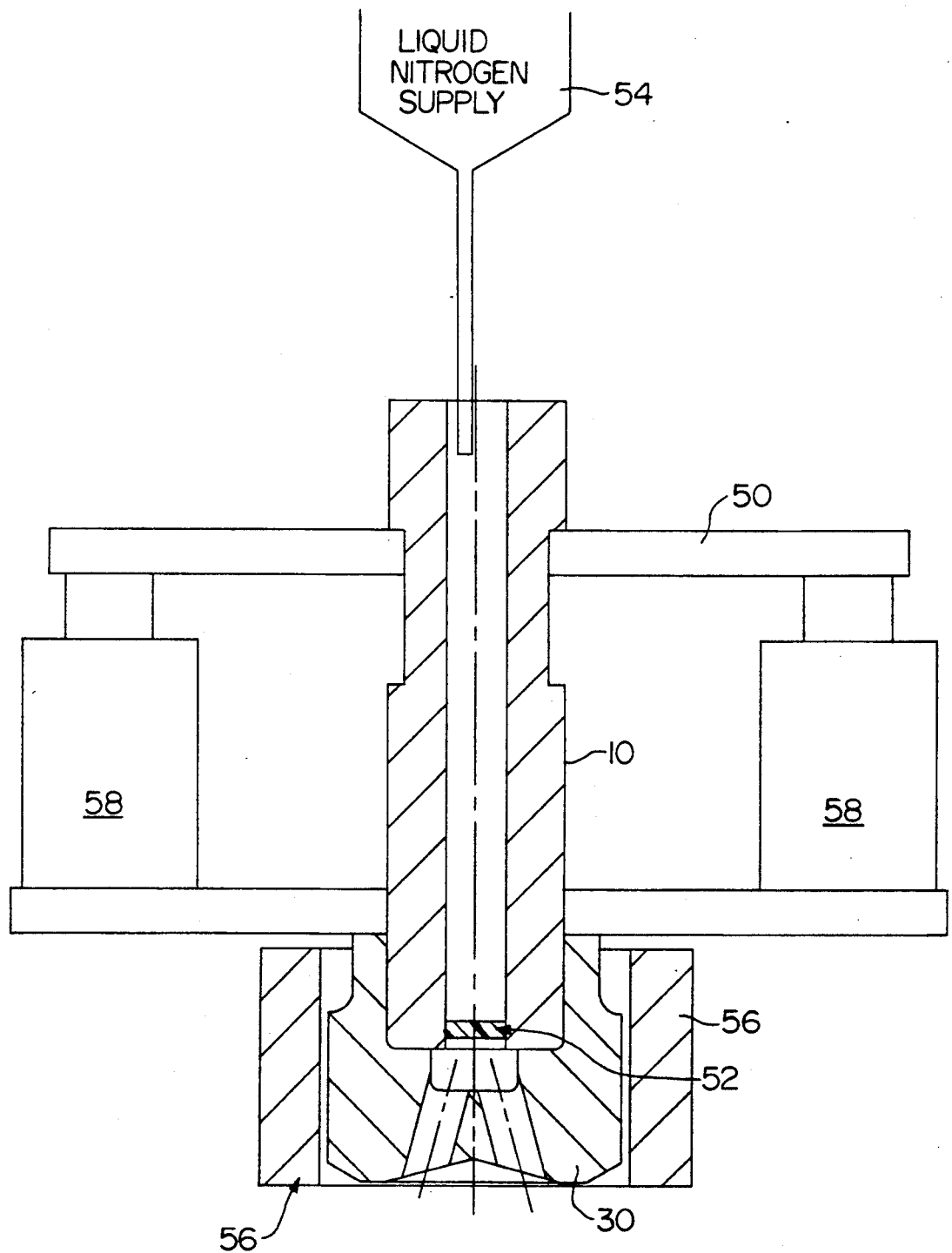
FIG. 8 is a diagrammatic view, in partial section, of a device for disassembling the bit.

As shown in FIG. 1, a rock drill bit embodying the invention comprises a generally cylindrical steel shank 10 having a tip 12 terminating at a cutter end face 14 perpendicular to the axis 16 of the shank. The side surfaces 18 of the shank tip are preferably perpendicular to this end face within fourteen seconds that is, substantially free of taper. Alternatively, however, the tip could have a slight reverse taper (i.e., slightly larger at its end), to better retain the cutter head. The tip, whose diameter is shown slightly greater than that of the rest of the shank to facilitate machining and polishing operations, preferably has a surface finish in the range of 30 to 50 microinches. A through bore 20 extends along the axis from the cutter end face 14 to the driving end face 22 (FIG. 8); this bore passes drilling fluids normally, as also receives liquid nitrogen during the disassembly procedure discussed further below.

A cutter head 30 to be installed on the shank tip includes a generally cylindrical body 32 substantially larger in diameter than the shank. The cutting face 34 of the head has conventional hardened cutting elements 36 installed in its surface, near the periphery 38 thereof. The cutter face depicted has plural holes 40 (at least one such hole is required) which pass through the body, converging toward the tool axis. The holes terminate at a recess 42 formed in the rear of the head. The recess has a shape like that of the shank tip, and has a preferred surface finish in the 30 to 50 microinch range. The sides 44 of the recess are preferably perpendicular to its bottom surface 46, within fourteen seconds, to insure full contact with the shank when assembled. The depth of the recess is selected based on the strength requirements of the union: obviously, a deeper recess produces a stronger joint. To maximize strength, the bottom of the recess is radiused or chamfered, and the tip is correspondingly radiused or chamfered to avoid interference at the corners.

Figure 3:
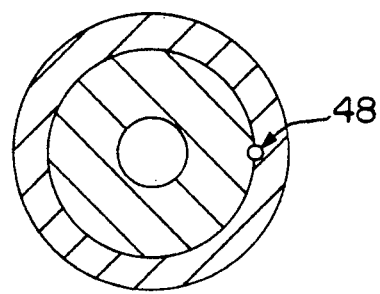
FIG. 3 is an enlarged sectional view thereof, taken along a plane 3—3 perpendicular to the axis of the bit.
Figure 4:
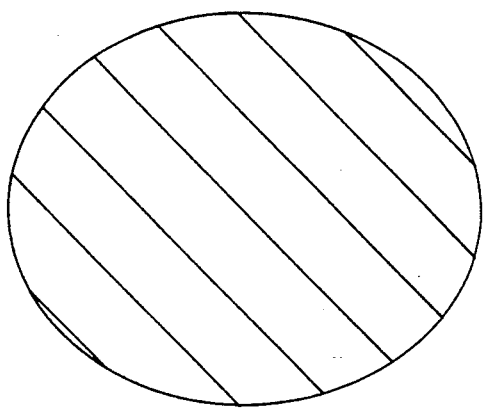
FIGS. 4–7 show non-circular shapes of alternative forms of the invention.
Figure 5:
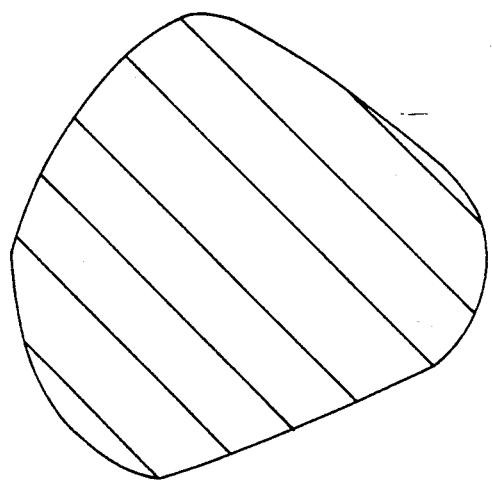
Figure 6:
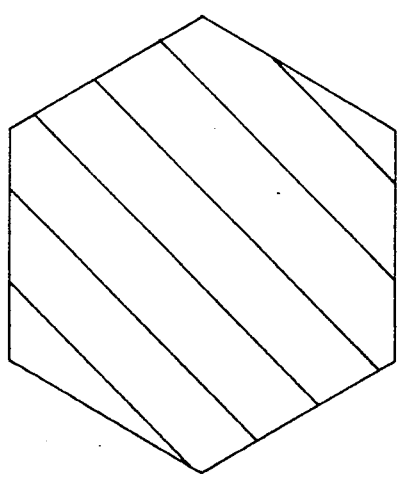
Figure 7:
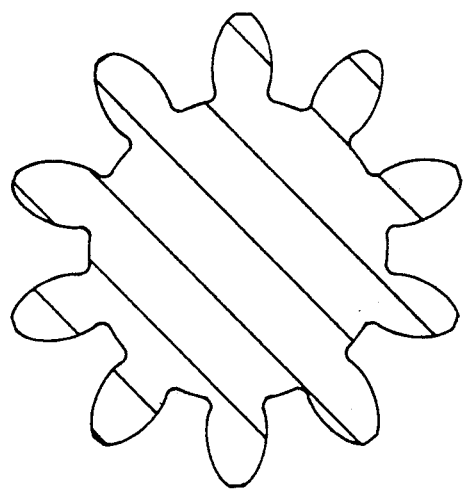

The recess and the shank tip may both be cylindrical, that is, circular in cross-section; however, to provide additional security against relative rotation between the parts, it is preferred that the cross-section be non-circular. Non-circularity can be in the form of a keyway or dowelway 48, shown in FIG. 3, or both parts can have oval or polygonal cross-sections, as shown in FIGS. 4-7.

The shank is 0.012% to 0.38% bigger in cross-sectional size than the recess into which it fits, so that there is substantial interference. By "size" we mean diameter, where the cross-sectional shape is substantially circular, or width where the shape is polygonal or irregular. An interference fit of about 0.15% may render it impossible to press the components together, particularly since the cutter elements are subject to damage, as it is desired to re-use at least the shanks. Therefore, the parts are preferably assembled by shrink fitting. One way of achieving a shrink fit is to immerse the shank, for a period of time, in liquid nitrogen, which boils at −321° F.

At −300° F., the linear coefficient of expansion of steel is 0.0000054; thus cooling it from room temperature to below 300° F. produces a shrinkage of about 0.2%, well more than the 0.15% interference. Once cooled, the shank can be inserted quickly into, and bottomed in, the recess. When the parts have returned to ambient temperature, they are firmly united, without having been subjected to any mechanical force application that could have produced visible damage or unseen cracks.

The tool is then placed in service. When the cutter elements have become worn, the bit is removed from service, and returned for renewing. There is no need to dispose of the entire bit, because the wear on the shank is significantly less than that on the head, on the order of two to three times less. Therefore, the shank can be re-used once or twice; however, it is necessary first to remove the worn cutter head. Attempting to pull the components apart mechanically is apt to damage the shank so that it cannot be re-used. Therefore, a differential thermal shrinkage process is used to disassemble the parts. This process is somewhat more difficult, since the components are in intimate thermal contact. However, we have found a way to achieve sufficient differential thermal contraction to permit the parts to be pulled apart with at most a light press. In practicing this method, the bit is placed in a fixture 50 (FIG. 8) with the cutter head 30 down. A seal 52 is then inserted in the bottom of the through hole, and liquid nitrogen 54 is poured into the hole. As the shank cools, its temperature is monitored, at a point just adjacent the cutter head. When the temperature of the shank at that point has fallen to below −100° F., or preferably further, the cutter head is rapidly heated by an electric induction device 56. A suitable unit is an induction furnace produced by Westinghouse, under model No. MFC-2, which has its own sensor for monitoring the temperature of the shank. Sufficient thermal differential is achieved to permit the parts to be easily pulled apart by hydraulic cylinders 58.

It will be appreciated by those of skill in this art that in the assembly procedure, it would be possible to heat the head, rather than cooling the shank, to achieve the requisite temperature differential, and such a variation is intended to be embraced by the invention.

It will be appreciated that a cryogenic fluid other than liquid nitrogen could be used with this invention; hence, the claims that follow use the generic term.

Inasmuch as the invention is subject to modifications and variations, it is intended that the foregoing description and the accompanying drawings shall be interpreted as illustrative of only one form of the invention, whose scope is to be measured by the following claims.

I claim:

1. A method of making a rock drill bit having a shank and a replaceable cutting head, comprising steps of
   producing a steel shank having a tip with an outer surface having a predetermined cross-sectional shape,
   producing a steel head having a working face at one end and a recess at the other end with a cross-section corresponding in shape to that of said shank tip, and having a size at least in the range of 0.012% to 0.38% less than that of said shank tip when the components are at the same temperature,
   cooling said shank with a cryogenic fluid to reduce its size to less than that of said recess,
   installing said head on said shank tip, and permitting the components to return to ambient temperature, to establish a shrink fit between the head and the shank.

2. The method of claim 1, wherein the shank tip outer surface, and the inner surface of the head recess, each have a surface finish in the range of 30 to 50 microinches.

3. The invention of claim 1, wherein the shank tip and head recess have corresponding non-circular cross sectional shapes.

4. The invention of claim 1, wherein the shank tip and head recess are both free of surface lubricants during assembly.

5. The invention of claim 1, wherein the size of said recess is about 0.15% less than that of said shank tip before the components are assembled.

6. A rock drill bit, having a shank and a replaceable cutting head, produced by the method of claim 1.

7. A method of disassembling a rock drill bit having a hollow shank and separate head which has been shrunk fit onto the shank, comprising steps of
   securing the shank in a fixture,
   filling the shank with a cryogenic fluid to reduce its size,
   monitoring the temperature of the shank adjacent the head,
   when said temperature is reduced to −100° F., heating the head rapidly with an electric induction coil to expand the head, and then
   pulling the head off of the shank.

8. A method of making a rock drill bit having as components a shank and a replaceable cutting head, comprising steps of
   producing a steel shank having a tip with an outer surface of a predetermined cross-sectional shape,
   producing a steel head having a working face at one end and a recess at the other end with a cross-section corresponding in shape to that of said shank tip, and having a size at least 0.15% less than that of said shank tip,
   changing the temperature of at least one of said components, to make the temperature of the shank sufficiently less than that of the head that the shank tip fits freely within said recess,
   installing said head on said shank tip, and permitting the components to return to ambient temperature, to establish a shrink fit between the head and the shank.

9. A method of making a rock drill bit having a shank and a replaceable cutting head, comprising steps of:
   producing a steel shank for transferring percussive energy from a hammer to the cutting head, said shank having a driving end face and a shank tip having a cutter end face, a through bore extending through an axis of the shank between said driving end face and said cutter end face, said tip having side walls substantially perpendicular to said cutter end face, said tip having a predetermined cross-sectional shape and diameter;

producing a cutter head having a cutter face impregnated with hardened cutting elements, said cutter head having a recess opposite said cutter face, a through hole from said cutter face to said recess, said recess having a cross-sectional shape corresponding to the cross-sectional shape of said shank tip and having a diameter in the range of 0.012% to 0.38% less than the diameter of said shank tip when at substantially equal temperature with the shank tip;

developing a temperature difference between the cutter head and the shank tip such that the shank tip has a diameter less than that of said recess;

inserting said shank tip within said recess; and, equalizing temperatures of the cutter head and the shank tip to establish a secure attachment of the cutter head on the steel shank.

10. The method of claim 9, wherein the temperature difference is developed by cooling the shank tip.

11. The method of claim 9 wherein the shank tip has an outer surface and said recess has an innner surface, each of said shank tip outer surface and recess inner surface having finishes in the range of 30 to 50 microinches.

12. The method of claim 9 wherein the recess and shank tip have corresponding non-circular shapes.

13. The method of claim 9 wherein the at-rest diameter of said recess is about 0.15% less than the diameter of said shank tip when the cutting head and shank tip are at the same temperature.

14. A rock drill bit, having a shank and a replaceable cutting head, produced by the method of claim 9.

15. The method of claim 10 wherein the shank tip is cooled by immersion in liquid nitrogen.

16. The method of claim 10 wherein the shank tip is cooled to at least $-320°$ F.

17. The method of claim 10 further comprising the steps of:

securing the shank in a fixture;

filling the shank with a cryogenic fluid to reduce its size;

monitoring the temperature of the shank tip;

heating the cutter head rapidly by using an electric induction coil to expand the cutter head when the monitored temperature of the shank tip is reduced to at least $-100°$ F.;

pulling the cutter head from the shank tip.

18. The method of claim 17 further comprising the step of placing a seal within the shank bore substantially at the cutter end face to seal the bore from the through hole of the cutter head to prevent cryogenic fluid from entering the cutter head.

19. The method of claim 17 wherein the cutter head is pulled from the shank tip using hydraulic cylinders.

* * * * *